US008059937B2

(12) United States Patent
Basile et al.

(10) Patent No.: US 8,059,937 B2
(45) Date of Patent: *Nov. 15, 2011

(54) RELATING TO THE COPY PROTECTION OF OPTICAL DISCS

(75) Inventors: Carmen Laura Basile, Maidenhead (GB); Jonny Boyd Reckless, Newark (GB); Lee Avery, Fremont, CA (US); Glenn Allen Siebert, Morgan Hill, CA (US); Kordian Jacek Kurowski, San Jose, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1369 days.

This patent is subject to a terminal disclaimer.

(21) Appl. No.: 10/939,186

(22) Filed: Sep. 10, 2004
(Under 37 CFR 1.47)

(65) Prior Publication Data

US 2005/0185926 A1    Aug. 25, 2005

Related U.S. Application Data

(60) Provisional application No. 60/545,979, filed on Feb. 19, 2004.

(51) Int. Cl.
*H04N 5/80* (2006.01)

(52) U.S. Cl. ........ 386/252; 386/253; 386/255; 386/257; 386/260; 369/84; 369/85; 369/83; 369/53; 360/60; 380/201; 380/202

(58) Field of Classification Search .................... 386/95, 386/91, 90, 111–112, 252, 253, 255, 257, 386/260
See application file for complete search history.

(56) References Cited

U.S. PATENT DOCUMENTS

| 4,584,641 | A |   | 4/1986 | Guglielmino |
| 4,835,757 | A |   | 5/1989 | Abiko |
| 5,319,627 | A | * | 6/1994 | Shinno et al. .............. 369/53.17 |
| 5,729,516 | A | * | 3/1998 | Tozaki et al. .............. 369/53.21 |
| 5,787,068 | A |   | 7/1998 | Arps et al. |
| 6,199,148 | B1 |   | 3/2001 | Naito |

(Continued)

FOREIGN PATENT DOCUMENTS

EP         1 132 914 A2    9/2001
(Continued)

OTHER PUBLICATIONS

Fox, Barry, "Copy Protection on CDs is 'worthless'", published Nov. 6, 2002, New Scientist. Available from : http://www.newscientist.com/article.ns?id=dn3020 [Accessed Sep. 23, 2005], 2 pages.

(Continued)

*Primary Examiner* — Helen Shibru
(74) *Attorney, Agent, or Firm* — Schwegman, Lundberg & Woessner, P.A.

(57) ABSTRACT

Generally the more effective is the copy protection provided on an optical disc, such as a DVD, the greater is the likelihood that the copy protection will adversely interfere with legitimate uses of the optical disc. It is therefore proposed to include at least one region of subversive data within the content in the data area of an optical disc, and then to prevent access to each such region of subversive data during normal playback of the disc. For a DVD, the subversive data may be incorporated within video objects and/or may be in gaps between files in the DVD_Video zone. It is arranged that there are no navigable paths to the regions of subversive data.

56 Claims, 14 Drawing Sheets

U.S. PATENT DOCUMENTS

| | | | |
|---|---|---|---|
| 6,330,392 B1* | 12/2001 | Nakatani et al. | 386/288 |
| 6,353,890 B1* | 3/2002 | Newman | 713/193 |
| 6,577,812 B1 | 6/2003 | Kikuchi et al. | |
| 7,030,788 B2* | 4/2006 | Aida et al. | 341/59 |
| 7,408,862 B2* | 8/2008 | Sako et al. | 369/59.25 |
| 7,464,411 B2* | 12/2008 | Heylen | 726/30 |
| 7,609,944 B2 | 10/2009 | Basile | |
| 7,761,927 B2* | 7/2010 | Reckless et al. | 726/32 |
| 2001/0018743 A1 | 8/2001 | Morishita | |
| 2002/0009291 A1* | 1/2002 | Fuchigami | 386/95 |
| 2002/0069389 A1 | 6/2002 | Sollish et al. | |
| 2002/0107865 A1* | 8/2002 | Rotem et al. | 707/102 |
| 2003/0227398 A1* | 12/2003 | Chen et al. | 341/59 |
| 2004/0076097 A1* | 4/2004 | Sawabe et al. | 369/53.22 |
| 2006/0140590 A1* | 6/2006 | Murase et al. | 386/96 |
| 2006/0146660 A1* | 7/2006 | Ikeda et al. | 369/30.13 |
| 2007/0053260 A1 | 3/2007 | Reckless et al. | |
| 2008/0219123 A1 | 9/2008 | Basile et al. | |

FOREIGN PATENT DOCUMENTS

| | | |
|---|---|---|
| EP | 1 164 590 A2 | 12/2001 |
| EP | 1 524 660 A1 | 4/2005 |
| EP | 1 528 557 A1 | 5/2005 |
| EP | 1 536 420 A2 | 6/2005 |
| FR | 2 607 953 A1 | 6/1988 |
| GB | 2 402 541 | 8/2004 |
| JP | 5266576 | 10/1993 |
| JP | 7235130 | 9/1995 |
| JP | 07307060 A2 | 11/1995 |
| JP | 09115242 A | 5/1997 |
| JP | 11283340 A | 10/1999 |
| JP | 11317012 A | 11/1999 |
| JP | 2000105970 A | 4/2000 |
| JP | 2001216418 A2 | 8/2001 |
| JP | 2001307424 A2 | 11/2001 |
| JP | 2002251820 A | 9/2002 |
| JP | 2003257120 A | 9/2003 |
| JP | 2004022098 A | 1/2004 |
| WO | WO97/02531 | 1/1997 |
| WO | WO 98/03973 | 1/1998 |
| WO | WO 98/52194 | 11/1998 |
| WO | WO 00/74053 A1 | 12/2000 |
| WO | WO 01/61695 | 8/2001 |
| WO | WO 01/61696 A1 | 8/2001 |
| WO | WO-0178074 A1 | 10/2001 |
| WO | WO 02/11136 | 2/2002 |
| WO | WO 03/034424 A2 | 4/2003 |
| WO | WO 03/077246 A2 | 9/2003 |
| WO | WO-03088239 A1 | 10/2003 |
| WO | WO 2004/109678 A1 | 12/2004 |
| WO | WO-2005081245 A2 | 9/2005 |

OTHER PUBLICATIONS

Halderman, John A, 2002, "Evaluating New Copy-Prevention Techniques for Audio CDs", Published on the internet and in "Proceedings of the 2002 ACM Workshop on Digital Rights Management (DRM2002)", Available from : http://www.cs.princeton.edu/~jhalderm/papers/drm2002.pdf [Accessed Sep. 23, 2005], 18 pages.

Halderman, J. Alex, 2002, "Evaluating New Copy-Prevention Techniques for Audio CDs", Princeton University and "Proceedings of the 2002 ACM Workshop on Digital Rights Management (DRM 2002)", Available from: http://www.cs.princeton.edu/~jhalderm/papers/drm2002.ppt [Accessed Sep. 23, 2005], 23 pages.

"Disabling/Bypassing Unwanted Titles (Version 2)", http://forum.doom9.org/showthread.php?s=&threadid=50245, 19 pgs.

"How to Partially Blank Out a Multi-PGC TitleSet", http://forum.doom9.org/showthread.php?s=&threadid=60596, 18 pages.

"Full DVD Backup Guide", http://web.archive.org/web/20031209132144/www.doom9.org/mpg/doitfast-guide.htm, 25 pages.

PSX Pirate, Nov. 9, 1998, "CDRWIN CD-Copy Settings", Entry on web page : "GameCopyWorld—CD Backup Hints—Obsolete", Available from http://m0002.gamecopyworld.com/games/gcw_hints.shtml, [Accessed Sep. 26, 2005] 8 pages.

"vStrip Guide", http://www.doom9.org/vstrip.htm, 10 pages.

"What's on a DVD?" http://www.doom9.org/dvd-structure.htm, 4 pages.

GB Search Report from GB0502253.8 dated Mar. 22, 2005, 1 page.

European Search Report for Application No. EP 05 25 0583 dated Jul. 12, 2006, 3 pages.

""What is Raw"", CDFreaks.com, G@M3FR3AK, (May 1, 2001), pp. 1-3.

"U.S. Appl. No. 10/585,967, Non-Final Office Action mailed Sep. 30, 2008", 15 pgs.

"U.S. Appl. No. 10/585,967, Preliminary Amendment mailed Mar. 9, 2007", 3 pgs.

"U.S. Appl. No. 10/585,967, Preliminary Amendment mailed Jul. 12, 2006", 7 pgs.

"U.S. Appl. No. 10/585,967, Response filed Mar. 30, 2009 to Non Final Office Action mailed Sep. 30, 2008", 16 pgs.

"Chinese Application Serial No. 200580005541.2, Office Action mailed Feb. 6, 2009", 10 Pages.

"International Application Serial No. PCT/GB2005/000370, International Search Report mailed Jul. 24, 2006", 2 pgs.

"Japanese Application Serial No. 2006-553638, Office Action mailed Aug. 19, 2008", 13 pgs.

"Japanese Application Serial No. 2006-553638, Office Action Mailed on Jan. 20, 2009", 12 pgs.

"United Kingdom Application Serial No. GB0502367.6, Search Report mailed May 12, 2005", 1 pg.

"United Kingdome Application Serial No. GB0502367.6, Further Search Report for GB0502367.6 dated Sep. 26, 2005", 1 pg.

"U.S. Appl. No. 10/585,967, Non-Final Office Action mailed Jul. 1, 2009", 14 pgs.

"U.S. Appl. No. 10/585,967, Response filed Nov. 2, 2009 to Non Final Office Action mailed Jul. 1, 2009", 12 pgs.

"U.S. Appl. No. 10/585,967, Notice of Allowance mailed Jan. 27, 2010", 6 Pgs.

"Canadian Application Serial No. 2496137, Office Action mailed Jun. 8, 2010", 3 pgs.

"Canadian Application Serial No. 2496137, Office Action Response Filed : Nov. 23, 2010", 11 pgs.

* cited by examiner

RELATING TO THE COPY PROTECTION OF OPTICAL DISCS

The present invention relates to a method of copy protecting an optical disc carrying content and control data and to such a copy protected optical disc. The invention also relates to a volume of content for application to a data carrying disc.

There are many techniques for copy protecting optical discs. For example, WO 00/74053 proposes copy protecting audio data on a digital audio compact disc (CD-DA) by rendering control data encoded onto the disc incorrect and/or inaccurate. The incorrect data encoded onto the CD is either inaccessible to, or not generally used by, a CD-DA player. Therefore a legitimate audio CD can be played normally on a compact disc music player, but the incorrect data renders the protected audio data on the CD unplayable by a CD-ROM drive.

As this earlier copy protection method prevents the user from using a CD-ROM drive legitimately simply to play the music or other audio on a CD-DA, alternative methods of copy protection have been proposed which, whilst preventing the production of usable copy discs, do not prevent or degrade the playing of legitimate optical discs on all players having the functionality to play such optical discs. Examples of such copy protection methods are described in WO 01/61695 and in WO 01/61696.

These further methods remove, corrupt, or otherwise render inaccurate control data associated with the information on the disc.

It has been found that there are many ways to deliberately subvert the content and/or the control data carried on an optical disc such that the disc cannot be reliably read or copied. However, there is a risk that the more effective the copy protection, the greater is the likelihood that the copy protection will adversely interfere with legitimate uses of the copy protected optical disc.

The present invention seeks to provide a copy protection method in which this risk of interference with a legitimate use is reduced.

According to a first aspect of the present invention there is provided a copy protected optical disc carrying content and control data in a data area, the content being arranged in one or more content files, and the control data providing access to the content, wherein at least one region which contains unreadable or subversive data is provided within the data area, and wherein access to the or each region of unreadable or subversive data is prevented during normal playback of the content on the disc.

With embodiments of a copy protected optical disc of the present invention, the unreadable or subversive data which is provided on the disc does not interfere with any legitimate usage of the disc because during normal playback the unreadable or subversive data is not accessed. This means, therefore, that unreadable or subversive data which is particularly effective can be incorporated onto the disc to provide maximum copy protection.

When the data on an optical disc is to be copied, the data is generally accessed on a sector by sector or file by file basis. It will be appreciated that the unreadable or subversive data will then either prevent or significantly slow the copying process, or will invoke error correction or data recovery techniques which will render the subsequent copy disc unplayable.

It will be appreciated that the content files may comprise any structures in the data area containing content. Similarly, the control data comprises any data providing a control function.

The unreadable or subversive data may be within the content and/or the control data on the optical disc and may be any type of data which will generally be unreadable or otherwise subvert playing or reading of the optical disc.

In an embodiment, at least one region of unreadable or subversive data is formed within the content files, that is, either within an individual content file or between content files.

For example, at least one region of unreadable or subversive data is formed as a gap between content files.

In an embodiment, particularly applicable to DVD-video, the content files are video object files and are composed of video objects (VOBs) which are divided into cells, and the cells can be accessed by respective pointers in a program chain.

At least one region of unreadable or subversive data may be formed as an additional cell within a video object, as an unstructured region within a video object, or between video objects, or in an existing cell within a video object. At least one region of unreadable or subversive data may be formed in a video object which is interleaved with existing content.

In one embodiment, there are no pointers accessing the at least one region of unreadable or subversive data. Thus, if a movie on a DVD is played, that region of unreadable or subversive data is not accessed because there are no pointers to the region. Thus, the unreadable or subversive data cannot interfere with the playing of the movie.

In an alternative embodiment, there are pointers accessing the at least one region of unreadable or subversive data but program chains defined by said control data are altered such that the unreadable or subversive data is not accessed during normal playback of the content on the disc. Although there are, in this case, pointers to said at least one region, the unreadable or subversive data still does not interfere with the playing of a movie as it is not accessed.

In a preferred embodiment, as indicated above, video objects containing cells are interleaved to form an interleaved block. The or each region of unreadable or subversive data is formed within an unplayed interleaved unit. This embodiment makes use of a familiar interleaving technique which provides distinct navigable paths on a DVD.

It will be appreciated that selected embodiments as defined above may be used alone to provide a copy protected disc or a combination of embodiments may be utilised on a single copy protected disc.

By way of example, where one or more regions of unreadable or subversive data are formed in existing cells within video objects, it may be convenient to alter control data to ensure that the unreadable or subversive data is not accessed during playback even though pointers accessing said existing cells do exist. In addition, one or more further regions of unreadable or subversive data may be formed within video objects, in one or more unstructured regions and/or within one or more additional cells. It may be convenient to arrange that there are no pointers accessing any of these further regions of unreadable or subversive data.

Additionally and or alternatively, at least one region of unreadable or subversive data is formed as a gap between content files. In this embodiment, the control data does not provide navigable paths to the or each gap between content files.

The gap or gaps between content files may be existing gaps, for example, provided between files within a DVD-Video zone. Additionally and/or alternatively, gaps may be created between contiguous files for the receipt of unreadable or subversive data.

Preferably, the or each region of unreadable or subversive data contains both buffering data and subversive data. This is to ensure that a device will not encounter the subversive data during normal play of the optical disc.

For example, the or each region may contain buffering data followed by subversive data, and/or the or each region may contain buffering data following the subversive data.

In an embodiment, the buffering data comprises non-subversive data such as sectors of zeros.

For example, the unreadable or subversive data may include or comprise data patterns chosen to cause DSV problems. Examples of DSV patterns, and their uses, are described, for example, in earlier application No. WO 02/11136.

In an embodiment, the data patterns are chosen to ensure that the DSV has a significant absolute value.

Additionally and/or alternatively, the data patterns are chosen to produce a DSV which has a rapid rate of change.

Additionally and/or alternatively, the unreadable or subversive data has incorrect control data associated therewith. For example, the incorrect control data associated with the unreadable or subversive data may comprise incorrect error correcting codes.

Additionally and/or alternatively, the unreadable or subversive data includes or has mistimed waveform transitions.

In an embodiment, the unreadable or subversive data may additionally and/or alternatively include or comprise bits or sectors which have been mechanically or physically damaged.

The unreadable or subversive data may additionally and/or alternatively include or comprise information bits or sectors of information bits whose information content has been rendered incorrect.

The present invention also extends to a method of copy protecting an optical disc carrying content and control data in a data area, wherein the content is arranged in one or more content files, and the control data provides access to the content, the method comprising the steps of:

providing at least one region within the data area containing unreadable or other subversive data, and arranging that the or each region of unreadable or subversive data is not accessed during normal playback of the content on the disc.

In an embodiment, at least one region of unreadable or subversive data is formed within an individual content file. Additionally and/or alternatively, at least one such region is formed between content files, for example, is formed as a gap between two adjacent content files.

In an embodiment, particularly applicable to DVD-video, the content files are video object files which are composed of video objects (VOBs) which are divided into cells, and wherein the cells can be accessed by respective pointers in a program chain.

In an embodiment, the method further comprises forming at least one region of unreadable or subversive data as an additional cell within a video object.

Additionally and/or alternatively, the method further comprises forming at least one region of unreadable or subversive data as an unstructured region within a video object or between video objects.

Additionally and or alternatively, the method further comprises forming at least one region of unreadable or subversive data in an existing cell within a video object.

In another embodiment, the method further comprises forming each region of unreadable or subversive data within a video object which is interleaved with existing content.

The method may further comprise arranging that there are no pointers accessing at least one region of unreadable or subversive data.

Additionally and/or alternatively, where there are pointers accessing at least one region of unreadable or subversive data, the method may comprise altering program chains defined by said control data such that the unreadable or subversive data is not accessed during normal playback of the content on the disc.

In an embodiment, which may be used alone or combined with the embodiments defined above, the method further comprises forming at least one region of unreadable or subversive data as a gap between content files. For example, the method may further comprise arranging that the control data does not provide navigable paths to the or each gap between content files.

The gaps between the content files may be existing or may be created to receive the unreadable or subversive data.

Preferably, both buffering data and the subversive data are provided within the or each said region.

In an embodiment, the method further comprises forming the subversive data in the or each said region so that it is surrounded by buffering data.

The method or methods of providing the unreadable or subversive data may be chosen as required. For example, the method may comprise including data patterns, which are chosen to cause DSV problems, into a region of the content files.

For example, the data patterns may be chosen to ensure that the DSV has a significant absolute value and/or to produce a DSV which has a rapid rate of change.

Additionally and/or alternatively, the method may comprise rendering control data in a region of a content file incorrect to provide the unreadable or subversive data.

For example, the incorrect data resulting in the unreadable or subversive data may comprise incorrect error correcting codes.

A method of the invention may additionally and/or alternatively comprise including mistimed waveform transitions into data in a region of a content file to render that data unreadable or subversive.

Additionally and/or alternatively, the method may further comprise mechanically or physically damaging bits or sectors within a region of a content file.

Additionally and/or alternatively, the method may further comprise including information bits or sectors of information bits, whose information content has been rendered incorrect, in a region of a content file.

According to a further aspect of the present invention there is provided a volume of content for application to a data carrying disc, the content being arranged within one or more content files, and the content being accessible by control data defining navigable paths, wherein the content files have been altered to include at least one region containing unreadable or subversive data, and control data defining the navigable paths has been adjusted such that access to the or each region of unreadable or subversive data will be prevented during normal playback of a disc.

A volume content of an embodiment of the invention may be encoded and applied, for example, to a DVD to provide copy protection for the content.

In an embodiment, the or each said region contains both buffering data and subversive data. The buffering data may be used to ensure that a player does not inadvertently encounter the subversive data when navigating an optical disc on which the volume of content has been encoded.

In an embodiment, the or each said region contains buffering data followed by subversive data and/or buffering data following the subversive data.

Preferably, the buffering data comprises sectors of zeros.

In embodiments, at least one region of unreadable or subversive data is formed within an individual content file, between content files, and/or as a gap between two adjacent content files.

In an embodiment, at least one region of unreadable or subversive data is formed as an unstructured region within a video object or between video objects.

In another embodiment, at least one region of unreadable or subversive data is formed as an additional cell within a video object.

Additionally and/or alternatively, at least one region of unreadable or subversive data is formed in an existing cell within a video object.

At least one region of unreadable or subversive data may be formed in a video object which is interleaved with existing content.

Preferably, the program chains do not include pointers accessing at least one region of unreadable or subversive data.

Where the program chains do include pointers accessing at least one region of unreadable or subversive data, the control data defining the program chains is altered such that the unreadable or subversive data is not accessed during normal playback of the content on the disc.

Additionally and/or alternatively, at least one region of unreadable or subversive data is formed as a gap between content files. In this case, the control data does not provide navigable paths to the or each gap between content files.

The or each gap between content files may be pre-existing or may have been created to receive the unreadable or subversive data.

In an embodiment, the unreadable or subversive data includes or comprises data patterns chosen to cause DSV problems. For example, the data patterns may have been chosen to ensure that the DSV has a significant absolute value. Additionally and/or alternatively, the data patterns may have been chosen to produce a DSV which has rapid rate of change.

In an additional and/or alternative embodiment, the unreadable or subversive data may have incorrect control data associated therewith.

For example, the incorrect control data associated with the unreadable or subversive data may comprise incorrect error correcting codes.

Additionally and/or alternatively, the unreadable or subversive data may include mistimed waveform transitions.

In an alternative and/or additional embodiment, the unreadable or subversive data includes or comprises bits or sectors which have been mechanically or physically damaged.

Additionally and/or alternatively, the unreadable or subversive data includes or comprises information bits or sectors of information bits whose information content has been rendered incorrect.

Embodiments of the present invention will hereinafter be described, by way of example, with reference to the accompanying drawings, in which.

The present invention is applicable to optical discs in general, but is described herein with reference to DVD formats. The process for formatting the user data to be applied to a DVD is in accordance with agreed conventions and is well understood. However, for clarity, the manner in which the data is formatted according to the DVD standards will now be briefly described. This process is applicable to all formats of DVD.

Figure 1:
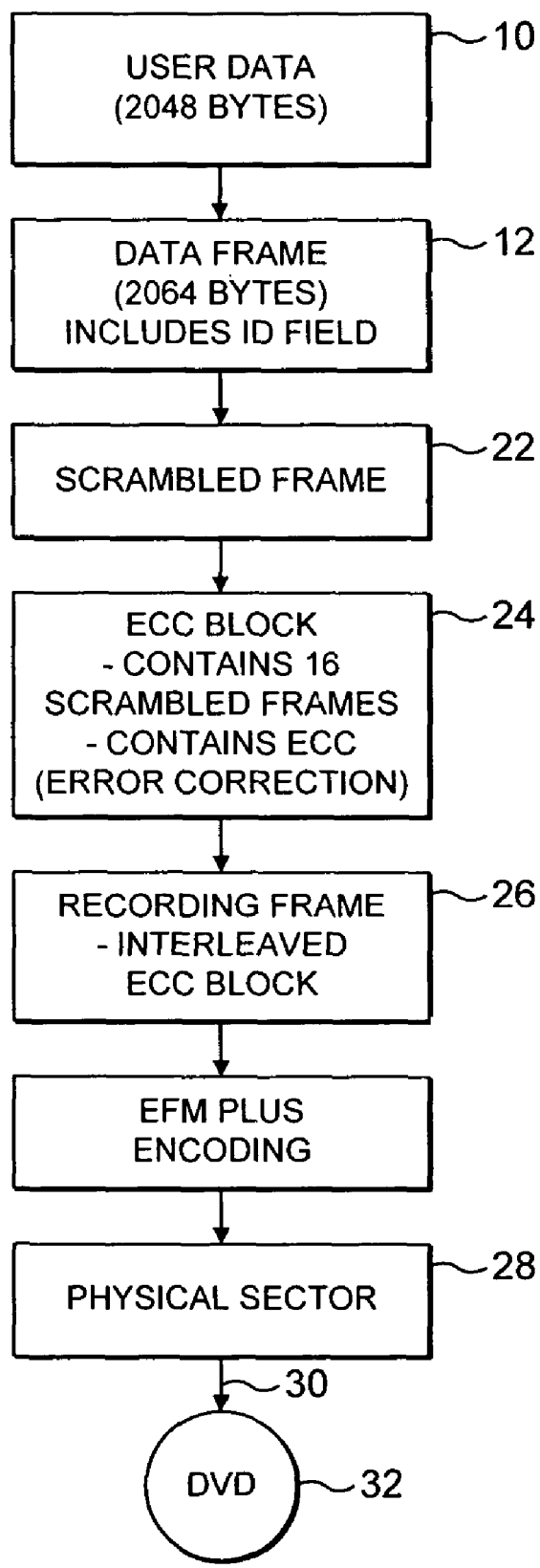
FIG. 1 shows schematically the writing of data to a DVD disc.

FIG. 1 shows the steps which are taken in formatting user data to be applied to a DVD. This user data is the information which is to be written to, and accessed from the disc and may comprise text, graphics, video, audio, programs and other content, and control data. As is indicated in FIG. 1, the user data is organised into blocks 10 which each contain 2,048 bytes. The first step in the formatting is to incorporate each block 10 of user data into a corresponding data frame 12 which has 2,064 bytes. The additional bytes incorporate identification and error correction codes.

As is further shown in FIG. 1, the data frame 12 is then scrambled to form a scrambled frame 22. This scrambling is to remove repeated sequences of data. The scrambling may be performed by XORing sixteen consecutive data frames with a first table and then XORing the next sixteen consecutive data frames with a second table and so on. The scrambled frame 22, therefore, includes 16×16 data frames 12.

Next an ECC block 24 is formed by error correction encoding in which sixteen consecutive scrambled frames 22 are arranged into an array having 192 rows each containing 172 bytes. To each of the 172 columns, sixteen bytes of "outer parity" are added and to each of the resulting 208 rows ten bytes of "inner parity" are added. These parity bytes are error correction codes related to the data in the rows and columns by known and understood error correction techniques.

The ECC block 24 is then input to interleaving means to create sixteen recording frames 26. These recording frames 26 are created by interleaving rows from the ECC block 24. Thus, the 37,856 bytes contained in the ECC block 24 are rearranged into sixteen recording frames $R_0, R_1, \ldots R_5$ each of which has 2,336 bytes. Since each recording frame R has 182 columns there are sixteen recording frames each consisting of 13 rows.

Figure 2:
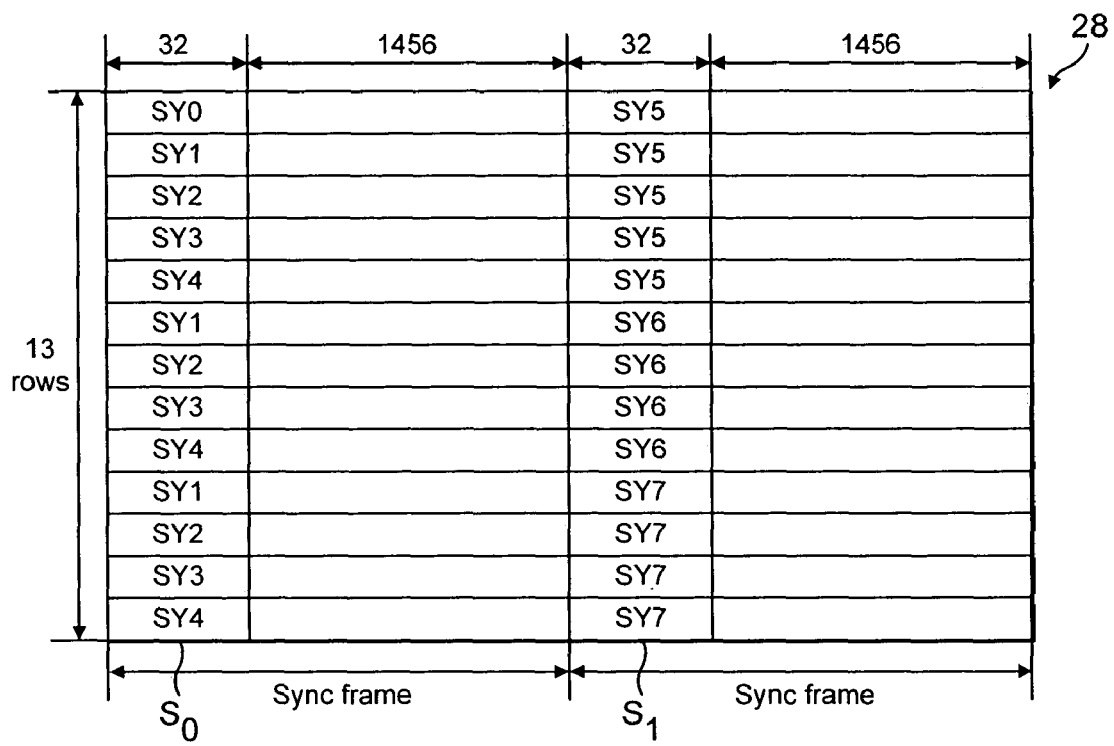
FIG. 2 shows a physical sector formed during formatting of the data to be written to a DVD disc.

The recording frames 26 are then subjected to EFM Plus encoding whereby a sequence of bits, that is, a series of 0s and 1s, is produced. Thereafter the data is arranged into sixteen physical sectors 28. One physical sector 28 is shown in FIG. 2. As can be seen, the EFM Plus encoded data from each recording frame is split down the middle and four byte sync codes $S_0$, and $S_1$ are inserted in front of each half row. Thereafter, the resulting sequence of bits 30 is applied to a disc 32.

EFM Plus encoding processes the data with 8 to 16 modulation, that is each eight bit byte is translated into a sixteen bit byte. This is done by selecting each sixteen bit code from a set of four tables. The encoding is arranged to maintain a low level of DSV (Digital Sum Value).

The bit stream 30 is written to the disc 32 by an appropriate mastering means to form pits and lands. In this respect, in a DVD writer the mastering means will generally be a laser beam recorder. Laser beam recorders are also used in mastering houses, but alternative mastering techniques are available and may be utilised.

Figure 3:
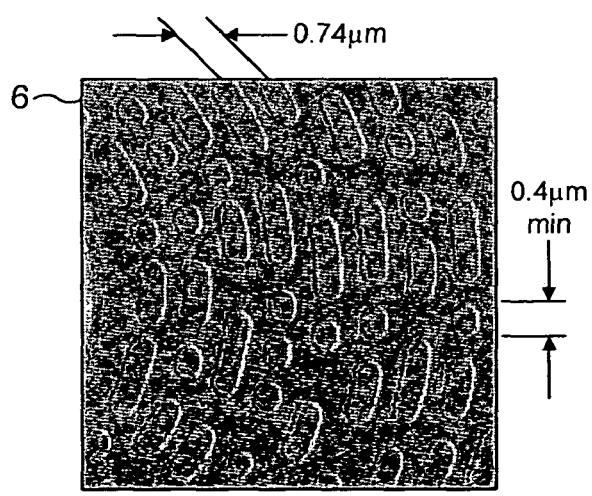
FIG. 3 shows an enlarged part of the surface of a DVD.

FIG. 3 shows an enlarged part of a DVD showing the pits 6 thereon. As is well known, these pits extend along a spiral track on the surface of the disc 32 and are separated by lands.

Figure 4:
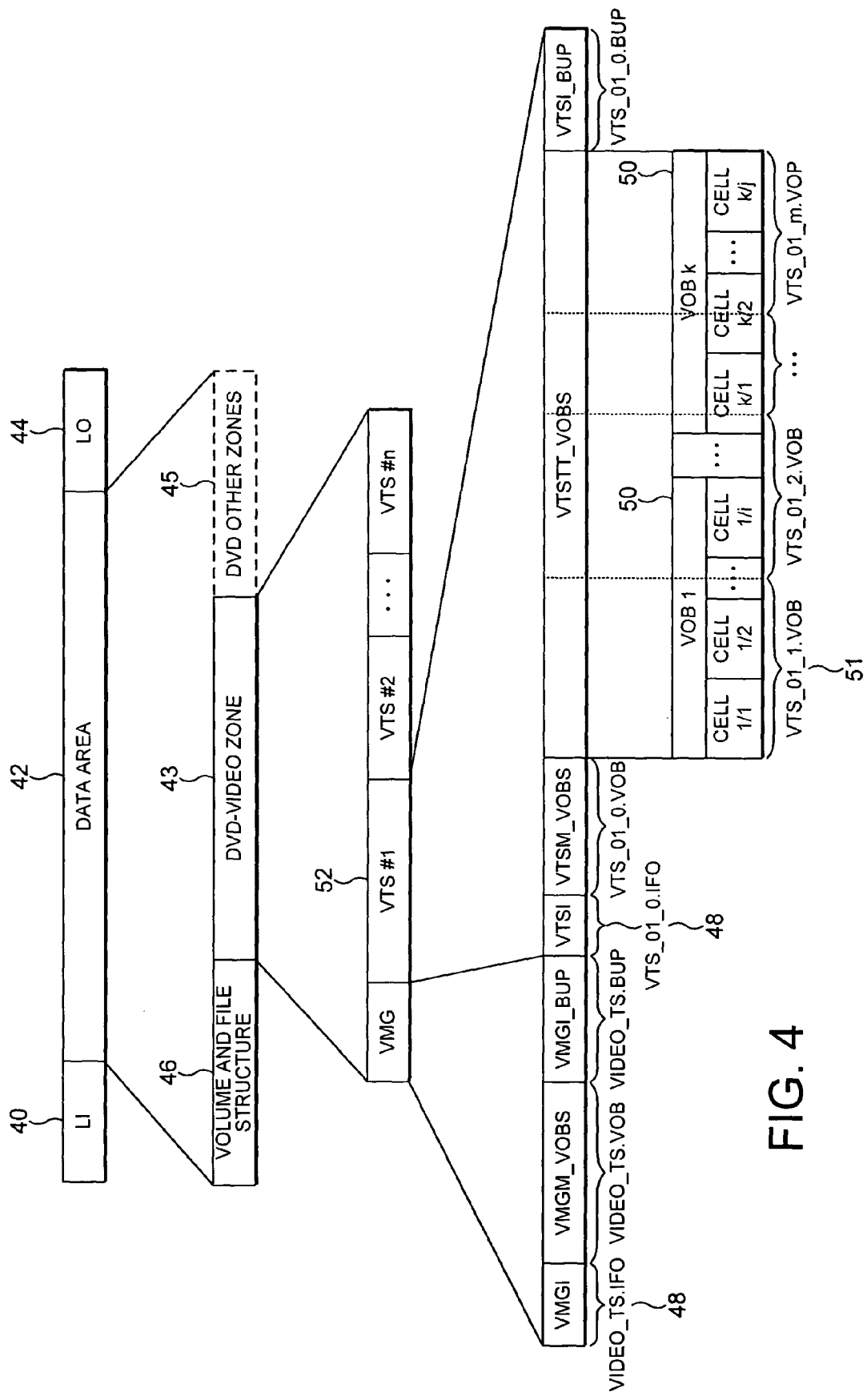
FIG. 4 shows the structure of data on a DVD.

The data on the DVD is arranged along the spiral track. As shown in FIG. 4, this data is structured to have a Lead-in 40, a data area 42 and a Lead-out 44.

The structure of the data on the DVD is the subject of standards, and is well known to those skilled in the art. Accordingly, only parts of the data structure of a DVD-Video which are relevant to the present invention are described and illustrated herein. As is further indicated in FIG. 4, the data area 42 includes a volume descriptor 46 which identifies the structure and contents of the data in the data area 42. This volume descriptor 46 is followed by a DVD-Video zone 43 and possibly by other DVD zones 45. The DVD-Video zone 43 comprises structures such as a Video Manager (VMG) and a number of video title sets (VTSs). Information files (IFO) 48 are provided in the Video Manager (VMG) and in each of the video title sets (VTSs) and provide the syntax by which navigation to video objects (VOBs) 50 is achieved. As is well known, each video object 50 contains MPEG streams, such as video, audio, and other content streams. The other content streams may comprise text and graphics, for example. A video object 50 also includes control data for controlling the presentation of its content together with control data enabling the data within the video object to be searched. The video objects 50 compose a set of video objects for the titles (VTSTT_VOBS) in video title set VTS#1. The VTSTT_VOBS is divided into video object files 51 whose size does not exceed 1 GB.

Figure 5:
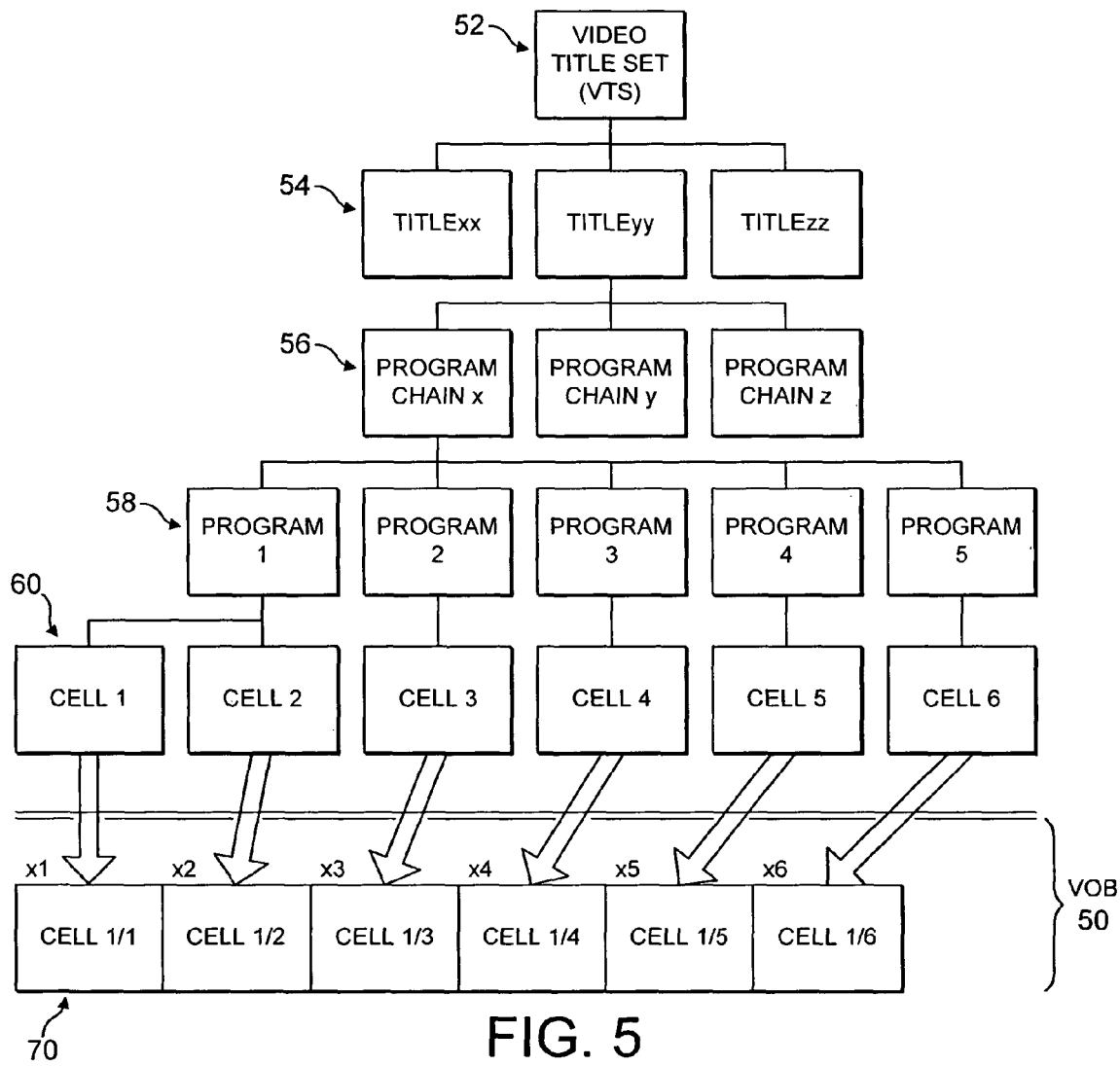
FIG. 5 shows the structure of a video title set (VTS) in a DVD.

FIG. 5 shows the structure of a video title set (VTS) and illustrates how, in a DVD, a movie, for example, stored in a single video object 50, can be accessed and navigated and thereby played.

In FIG. 5, not all of the connections and pointers between files in the DVD-Video structure have been illustrated. Instead, FIG. 5 illustrates how a single video object 50 is addressed.

In the structure illustrated in FIG. 5 there is a video title set (VTS) 52 containing a collection of titles 54. Each title 54 includes one or more program chains 56. In FIG. 5, the title 54 "TITLE yy" addresses the chosen video object 50 and does so by way of program chain x. Each program chain 56 includes a number of individual programs as 58 which are typically arranged to be played in sequence. Each of the programs 58 has one or more pointers as 60, and each pointer 60 addresses a particular part of the corresponding video object.

As is illustrated in FIG. 5, each video object 50 is divided into a number of individual cells 70. Typically, each of the programs 58 points, by way of its pointer 60, to an individual one of the cells 70 of the video object 50. However it is possible as also indicated in FIG. 5 for a single program 58, as program 1, to have more pointers 60, for example, two pointers which address two cells 70, as cells 1/1 and 1/2. The arrangement is generally that, as the programs 58 are played in sequence by way of the relevant program chain 56, the cells 70 within the video object 50 are similarly accessed in order.

Figure 6:
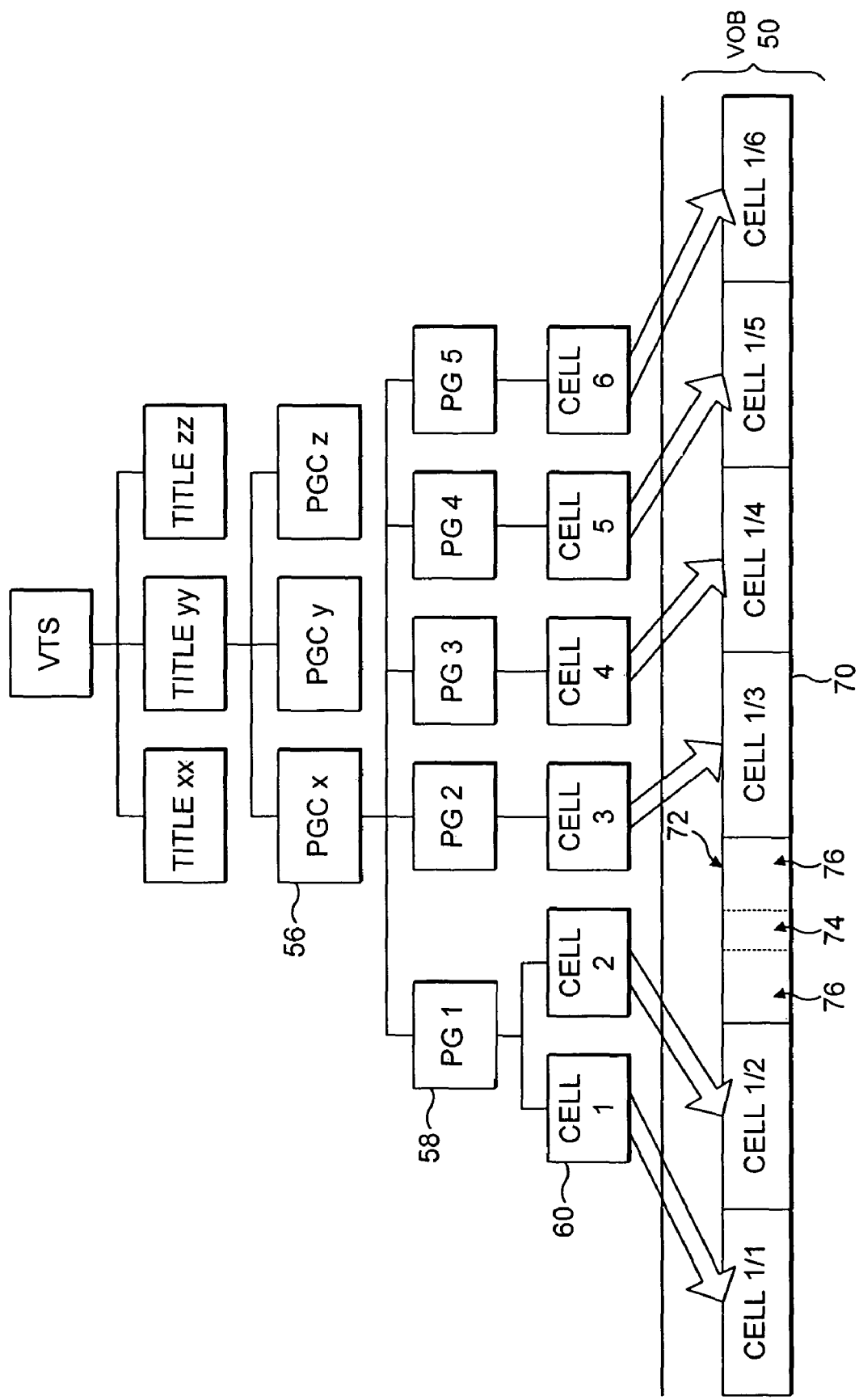
FIG. 6 shows a view similar to that of FIG. 5 but illustrating copy protection by the provision of an unstructured region in a video object.

FIG. 6 shows an arrangement similar to that of FIG. 5 except that the DVD illustrated in FIG. 6 has been copy protected by an embodiment of the present invention. It will be seen, by a comparison of FIGS. 5 and 6, that an unstructured region 72 has been interposed between two cells 70 of the video object 50. As is also shown in FIG. 6, subversive data indicated at 74 has been incorporated within the unstructured region 72. There is a buffer area 76 on either side of the subversive data 74 within the unstructured region.

The subversive data 74 in the unstructured region 72 of the video object 50 may be any data which will stop or subvert a drive reading or playing the content of the region 72 on an optical disc, and/or will stop or significantly slow down the copying of data from the optical disc and/or will prevent usable copies of data on the disc being made. Examples of subversive data which meet these requirements include data with incorrect error correcting codes, and information which has been deliberately altered. The data might be, or include, data patterns chosen to cause DSV problems, for example, chosen to ensure that the DSV has a significant absolute value and/or that the DSV has a rapid rate of change. A description of DSV data patterns and the problems they cause is given, for example, in WO 02/11136. It is additionally and/or alternatively possible to provide data which has mistimed waveform transitions.

In the main, it is expected that values of the data, which may be content and/or control data, will be changed during encoding of the data onto the optical disc whereby the subversive data is produced. However, it is additionally and/or alternatively possible to provide subversive data on the optical disc by mechanically or physically damaging bits or sectors of bits on the disc.

Examples of data which has been altered, and which can therefore provide subversive data for use in embodiments of the invention are described, for example, in WO 00/74053, WO 01/61695 and WO 01/61696. Any or all of such subversive data may be used in the present invention.

Of course, when provided on an original disc, subversive data could cause problems for a device seeking to play or otherwise use the optical disc for legitimate purposes. Accordingly, and as shown in FIG. 6, steps may be taken to ensure that during normal use of the optical disc 10, for example, during play by a device, the subversive data 74 is never accessed. In this respect, and as illustrated in FIG. 6, there are no pointers 60 in the main program chain 56 pointing to the unstructured region 72. It will also be appreciated from a consideration of FIG. 6, that if the program chain 56, for example, is executed, the device will not navigate to the unstructured region 72. In this way, the subversive data can be provided on the disc without any risk that it will subvert normal playing of the disc.

As set out above, there is a buffer area 76 on either side of the subversive data 74 within the unstructured region 72. In this respect, some devices do read ahead when playing a disc. Thus, it may be that a device which has been caused to access the first cell and then the second cell of the video object file 50 may look ahead to the next cell and, in the arrangement of FIG. 6, would encounter the unstructured region 72. To ensure that there is no risk that any such look ahead techniques would encounter the subversive data 74, the areas of buffer data are provided. Generally, the data within the buffering zones 76 has non-subversive properties and, for example comprises pluralities of zeros.

Thus, it will be understood from the above that a DVD can be provided with subversive data as 74 without risk that that subversive data will adversely affect normal playing of the disc.

When an attempt is made to read data from a copy protected disc as illustrated in FIG. 6, rather than playing the video and audio content on the disc, many commercially available devices arranged to copy DVDs seek to extract all of the data on the disc. Copying is generally undertaken on a sector by sector or on a file by file basis. For example, the device accesses each sector on the disc in turn to extract the data in that sector. Thus, during a copying operation, the device will access the unstructured region 72. It is possible that the subversive data 74 in the unstructured region 72 will cause the read operation of the disc to fail or to be slowed significantly. Alternatively, the subversive data may result in the generation of error flags which will mean that any copy that the device is able to make will generally be unplayable.

Not only is it arranged that there is no navigation to the unstructured region 72, but no information about the existence or location of the region is explicitly included in the information file 48.

Figure 8:
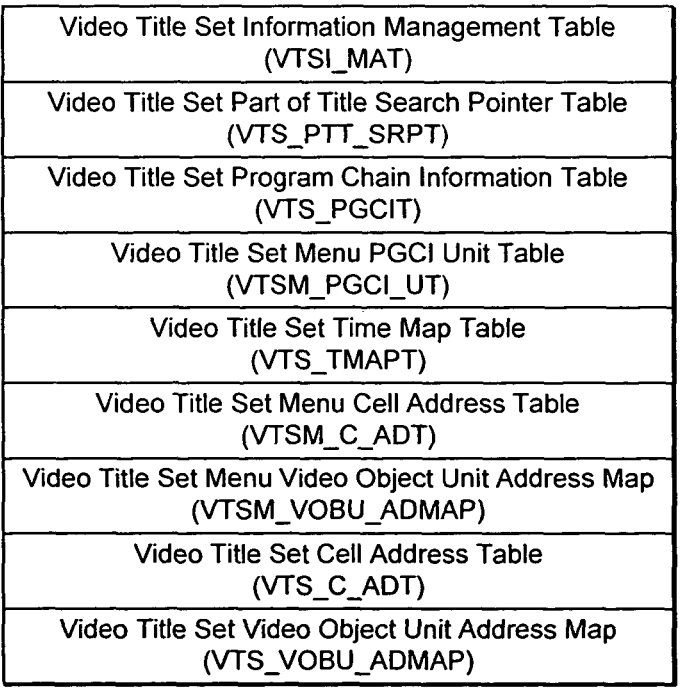
FIG. 8 shows the tables within a video title set information file (VTSI)

Alternatively, some information about the unstructured region might be included in the Video Title Set Information (VTSI) Table 90 which is illustrated in FIG. 8. For example, an extra entry for the region 72 may be incorporated within the VTS_VOBU_ADMAP table.

As illustrated in FIG. 6, subversive data 74 may be included in the video object 50 by inserting therein an unstructured region 72 also containing buffering zones 76. In a development of the invention, and as described below with reference to FIG. 6a, the subversive data may alternatively be contained in a structured cell which is never accessed. That is, a region of subversive data may be inserted into existing or additional, but unplayed, cells. It is generally preferred that buffering zones are provided around the subversive data.

Where subversive data is inserted into existing or additional cells, this will increase the size of the VTSTT_VOBS. If the resulting size of the video object files 51 into which VTSTT_VOBS is divided exceeds the maximum size allowed, (1 GB), the boundaries of the video object files 51 are moved and/or new video object files 51 may be created.

Figure 7:
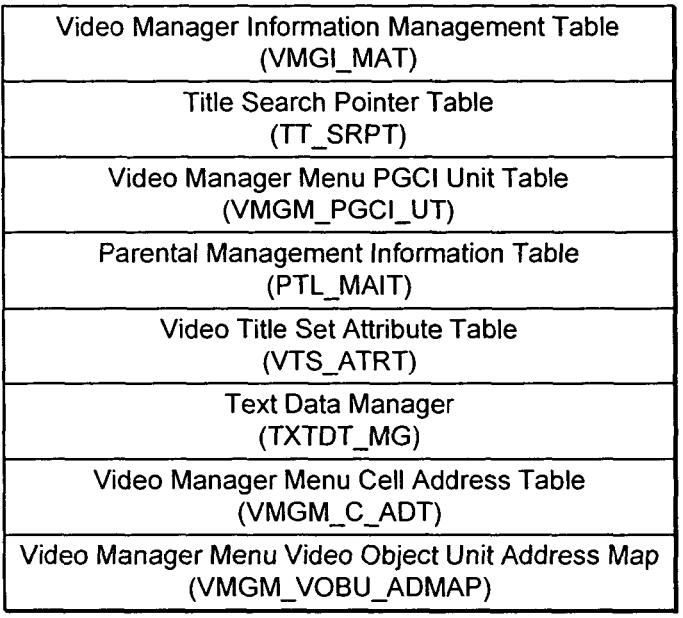
FIG. 7 shows the tables within a video manager information file (VMGI)

FIGS. 7 and 8 show the tables in the Video Manager Information File (VMGI) 48 and in the Video Title Set Information File (VTSI) 48. These tables may be altered to incorporate a region of subversive data as described above.

FIG. 7 shows the Video Manager Information (VMGI) table 80 which is found in the VMG information file 48 of a DVD. This table 80 will be familiar to anyone skilled in the art and is not further described herein.

In the example to be illustrated by reference to FIGS. 6, 7 and 8, it is assumed that an unstructured region 72 of total size x sectors, containing subversive data 74 and buffer areas 76, is to be inserted in VTS n. Then, within the Title Search Pointer Table (TT_SRPT), which is within the video manager IFO (VIDEO_TS.IFO), the value for the VTS starting sector for all titles contained in VTS n+1 onwards is increased by x.

FIG. 8 shows the Video Title Set Information (VTSI) table 90, which is contained within a VTS information file 48. The alterations to be made to the table 90 are set out below.

Within the Video Title Set Information Management Table (VTSI_MAT) provided in the IFO file for VTS n (VTS_n_0.IFO) the value for the last sector of VTS is increased by x.

Assuming that the x sectors of subversive and buffer data 74, 76 are to be inserted immediately before cell a+1 in the VOB 50, and that either cell a, or cell a+1, or both cells, are not in an interleaved block, then, for each pointer pointing to cell a+1 onwards, the values for the cell start sector, the cell last sector and the start sector of last VOBU are increased by x in the Cell Playback Information Table (C_PBIT) within the Video Title Set Program Chain Information Table (VTS_PGCIT). If any of the cells a+1, a+2 are in an interleaved block, the value for the end sector of the first interleaved unit (ILVU) in the VTS_PGCIT should also be increased by x. Interleaving is described below.

In the Video Title Set Cell Address Table (VTS_C_ADT), the values for the cell start sector and the cell end sector for each cell starting from cell a+1 are increased by x.

In addition, in the VTS_TMAPT and in the VTS_VOBU_ADMAP tables, all the sector values that are greater than or equal to the value for the start sector of cell a+1 are increased by x.

Furthermore, in the Presentation Control Information (PCI) and in the Data Search Information (DSI) in the Navigation Pack of all the VOBUs in the VTSTT_VOBS after the insertion, the value of the sector numbers are increased by x.

It will be appreciated that these suggestions for altering the tables 80 and 90 represent a single example as to how an unstructured region of subversive data 74 might be inserted within a video object file 51 of a DVD.

Figure 6A:
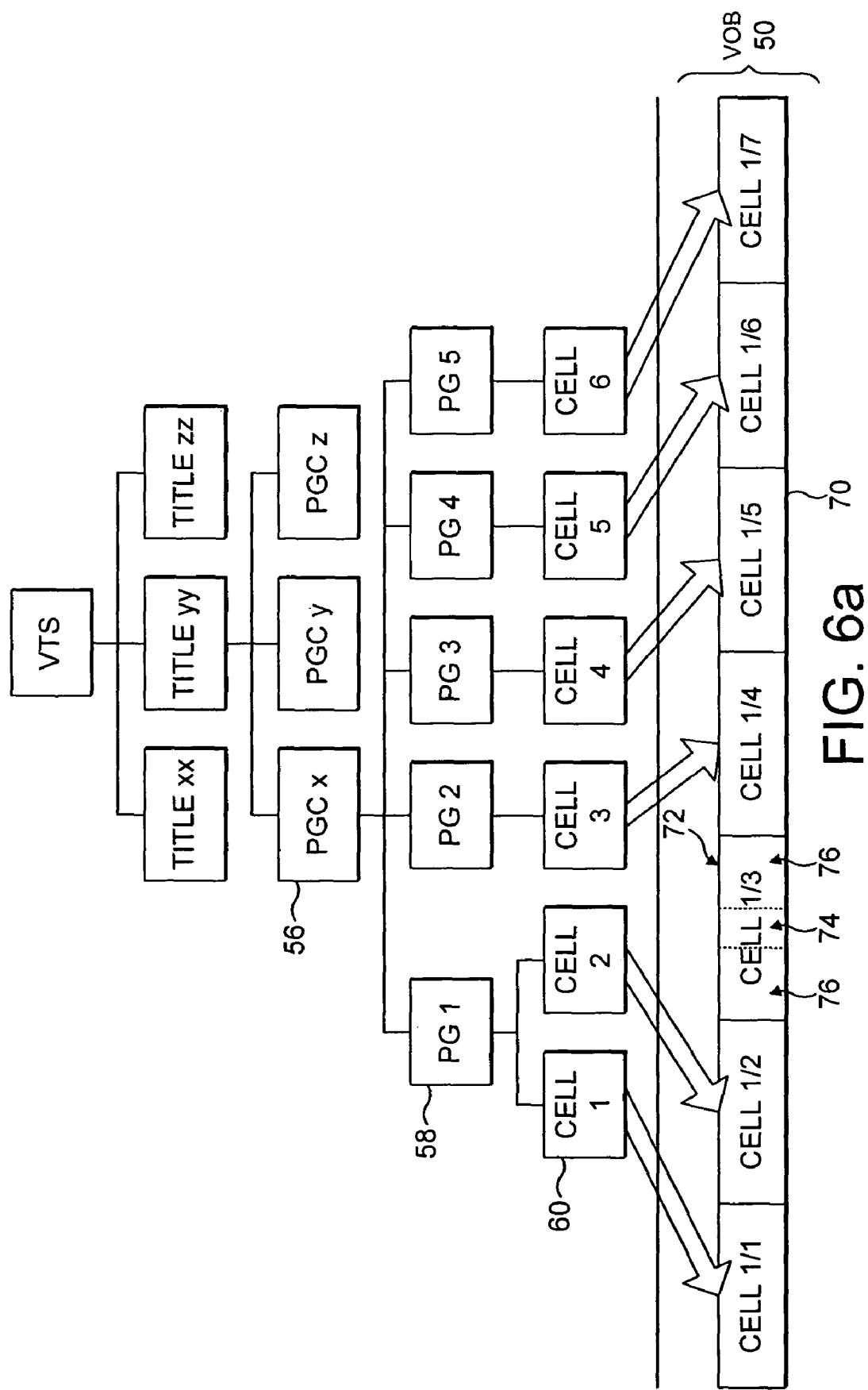
FIG. 6a is a view similar to that of FIG. 6 except that the addition to the video object is an additional cell.

If, instead of arranging the subversive data within the video object 50 as an unstructured region inserted between two cells, an additional cell 72 as illustrated in FIG. 6a is inserted, for example, between cell a (cell 1/2 in FIG. 6a) and cell a+1 (cell 1/3 in FIG. 6a), further adjustments will need to be made, as follows.

The additional cell, shown as 72 in FIG. 6a, will be assigned a VOB and a cell ID, shown as cell 1/3. Thus, the cell IDs for cells a+1 and following will need to be adjusted and the VOB IDs for cells a+1 onwards may also need to be altered. All the tables containing information for the VOB and the cell ID will require modification. These tables include the Cell Position Table (C_POSIT) within the VTS_PGCIT table in the VTSI Table 90, and the VTS Cell Piece Information (VTS_CPI) entries within the VTS_C_ADT table in the VTSI Table 90. In addition, modifications may be made to the DSI General Information (DSI_GI) in the DSI contained in the Navigation Pack of each VOBU in the VTSTT_VOBS. Furthermore, an extra entry for the additional cell may be added in the VTS_C_ADT and extra entries for the VOBUs the additional cell is composed of may be included in VTS_VOBU_ADMAP.

In the embodiments described above, subversive data is provided in an unstructured region and/or in an additional cell inserted into a video object 50. Additionally and/or alternatively, subversive data may be incorporated into one or more existing cells. Where an existing cell already contains data, the subversive data may be inserted into the existing cell by overwriting the existing data with subversive data. As previously, it will have to be ensured that there is no navigation to the existing cell which incorporates the subversive data during playback of the content on the disc. Of course, it will also have to be ensured that any data which has been overwritten is not required during playback of the content on the disc.

In the embodiments illustrated in FIGS. 6 and 6a the subversive data is inserted in the video object 50. It is additionally and/or alternatively possible to include the subversive data in other regions of the content files to which there is normally navigation during playback of the content on the disc. As described above, and as illustrated in FIG. 6b, the DVD-Video zone 43 comprises a Video Manager (VMG) and a number of video title sets (VTSs) which are composed of various files. There is navigation to these files, for example, by way of the information files (IFO) 48 provided.

It is additionally and/or alternatively possible to include the subversive data in other regions of the data area to which there is no navigation during playback of the content of the disc. In some syntaxes, gaps 49 are provided between files and subversive data may be inserted into such gaps 49. It will be appreciated that no navigation is provided to such gaps 49.

Figure 6B:
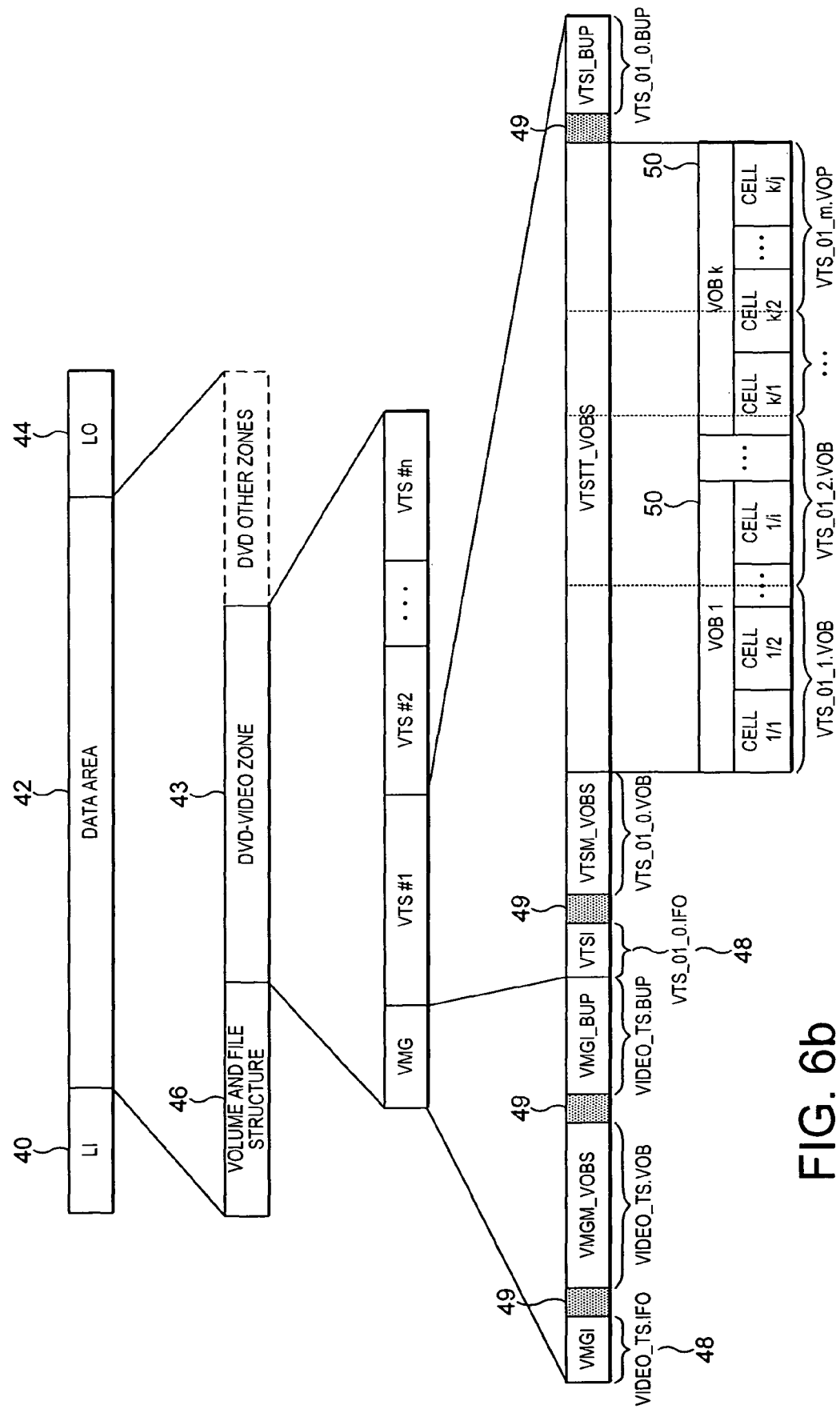
FIG. 6b is a view similar to that of FIG. 6 but shows the provision of gaps between files in a DVD-Video zone.

Additionally and/or alternatively gaps 49, as shown in FIG. 6b, may be inserted between files in the DVD-Video zone 43 and then subversive data may be inserted into the gaps created. FIG. 6b illustrates locations at which gaps 49 may be inserted.

Space for the gaps 49 can be allocated by adjusting the values for the start sector addresses in the VMGI and/or in the relevant VTSI, in the VIDEO_TS folder prior to the image building process, as such values determine the location of the files within the DVD-VIDEO zone 43. For example, in order to create a gap 49 of size x between the VIDEO_TS.IFO and VIDEO_TS.VOB files, the value for the start address of the VMGM_VOBS in the VMG management table VMGI_MAT within the VMGI (VIDEO_TS.IFO) is increased by x. In addition, within the Title Search Pointer Table (TT_SRPT) which is within the VMGI, the value for the VTS starting sector for all titles is increased by x. Alternatively, gaps may be provided after the image building process.

Figure 9A:
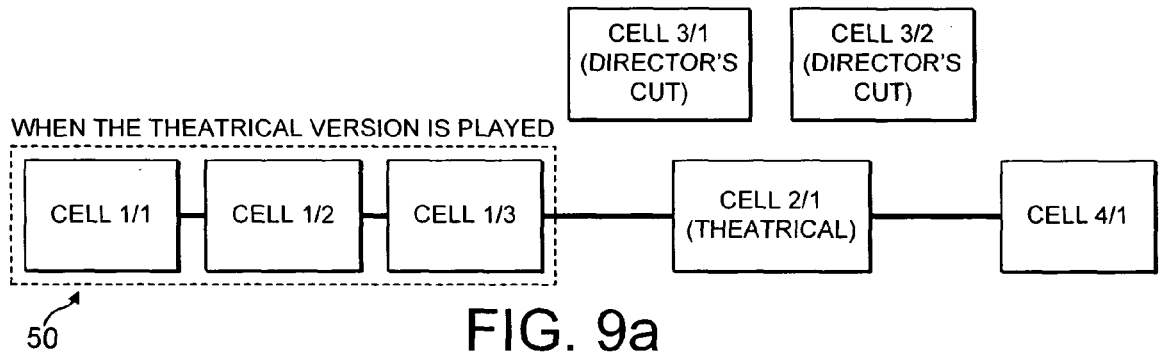
FIGS. 9a and 9b illustrate the provision of two different playback paths using interleaving of video objects.
Figure 9B:
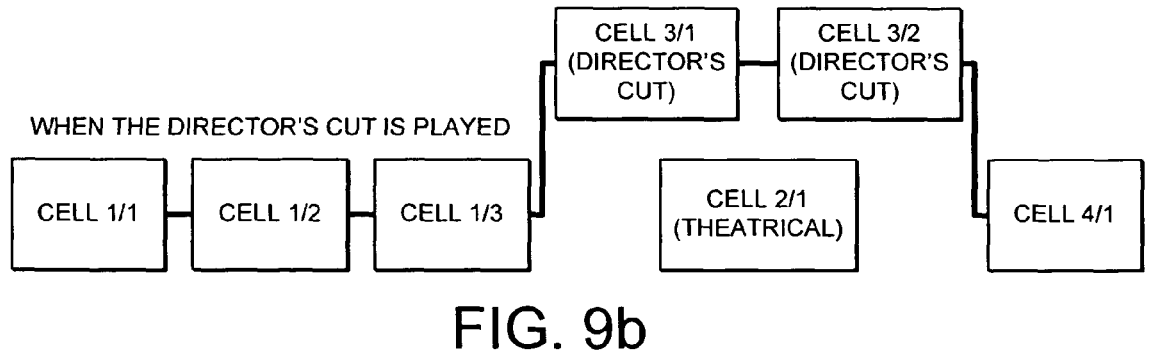

FIGS. 9a and 9b illustrate a known technique for allowing two or more versions of a movie, for example, to be carried by a single DVD in an efficient manner. The movie is stored in video objects 50 and the material which is common to both versions of the movie is only present once on the disc to preserve space. Where the two versions diverge, their content is interleaved so that the size of the jumps required by the device playing the disc during disc playback are sufficiently small that seamless playback of the content can occur.

Thus, FIGS. 9a and 9b illustrate a portion of the playback of two versions of a single movie where FIG. 9a shows playback of a first version, for example, the theatrical release version, whilst FIG. 9b shows playback of an extended version, for example, the director's cut. It will be seen, therefore, that the cells 1/1, 1/2, 1/3 of a first video object 50 (VOB 1) are common to both versions but that, in FIG. 9a, the theatrical version then plays the cell 2/1 which constitutes a second video object (VOB 2) and then moves to the first cell 4/1 of a fourth video object (VOB 4). By contrast, and as shown in FIG. 9b, the extended version omits the second video object (VOB 2), and thus the cell 2/1, and plays instead the cells 3/1 and 3/2 in a third video object (VOB 3).

Figure 10:
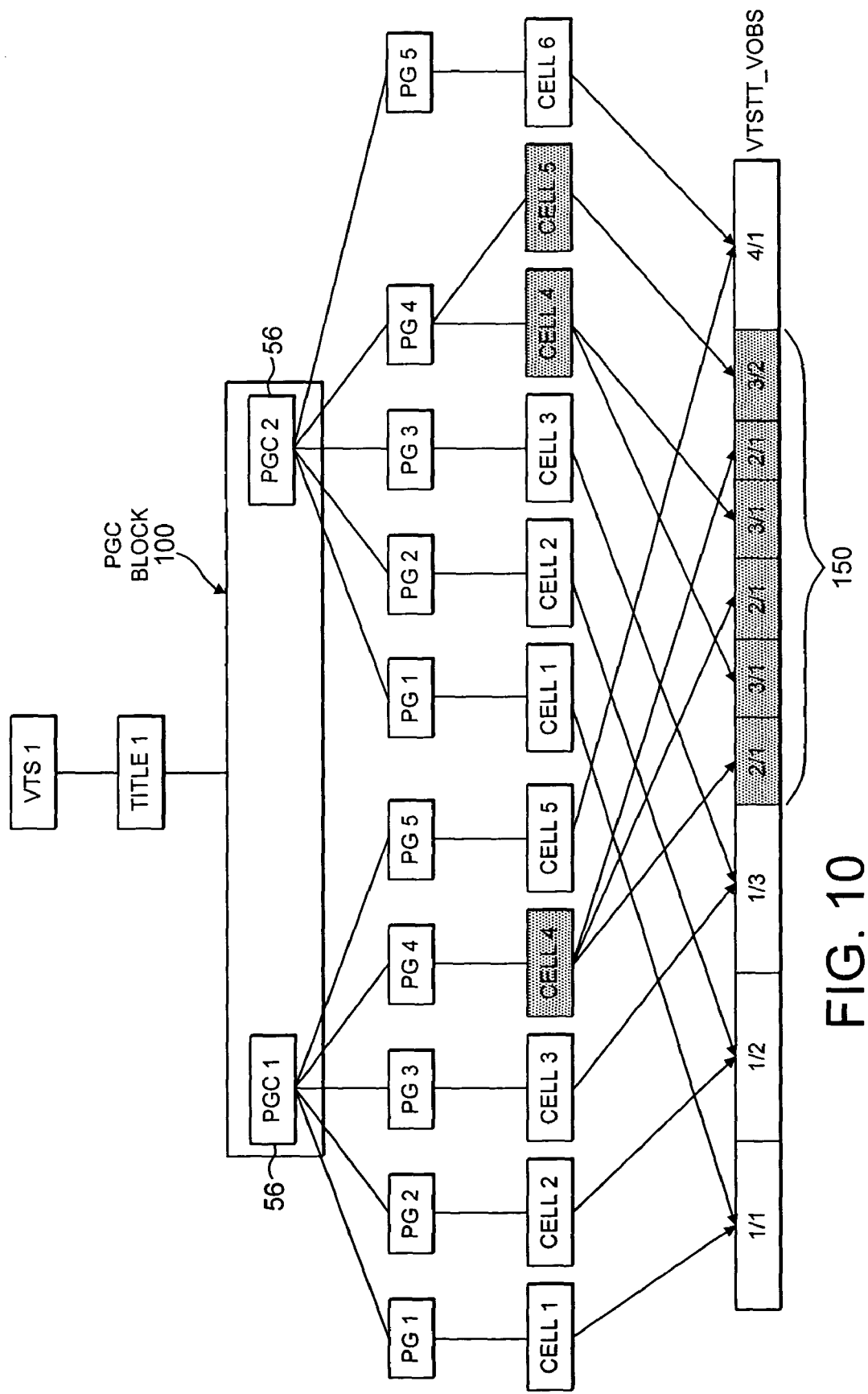
FIG. 10 shows the structure of a video title set (VTS) where interleaving is used in a technique as illustrated in FIGS. 9a and 9b.

FIG. 10 shows the structure of the video title set (VTS) for the technique illustrated in FIGS. 9a and 9b and shows an arrangement of the cells 2/1 and 3/1 and 3/2 of FIGS. 9a and 9b on the disc. As is illustrated in FIG. 10, the second and third video objects, VOB 2 and VOB 3 have each been sliced into three parts and have been interleaved as indicated at 150 to form three interleaved units (ILVUS). The effect is to interleave the cell 2/1 with cell 3/1 and with cell 3/2.

As is shown in FIG. 10, a program chain block 100 containing two program chains 56 is provided. The first program chain PGC 1 will play the theatrical version of the movie as illustrated in FIG. 9a, whilst the second program chain PGC 2 will play the director's cut version illustrated in FIG. 9b.

It will be appreciated from a consideration of FIG. 10 that when the program chain PGC 1 is executed, cells 1/1, 1/2, 1/3, 2/1 and 4/1 will be played. Thus, the pointer, cell 4, of the fourth program PG 4 of the first program chain PGC 1 accesses the three units (ILVUs) composing cell 2/1 and effectively jumps over the unwanted interleaved cells 3/1 and 3/2. Similarly, when the second program chain PGC 2 is executed, cells 1/1, 1/2, 1/3, 3/1, 3/2 and 4/1 are played whereby the director's cut as shown in FIG. 9b is played.

Figure 11:
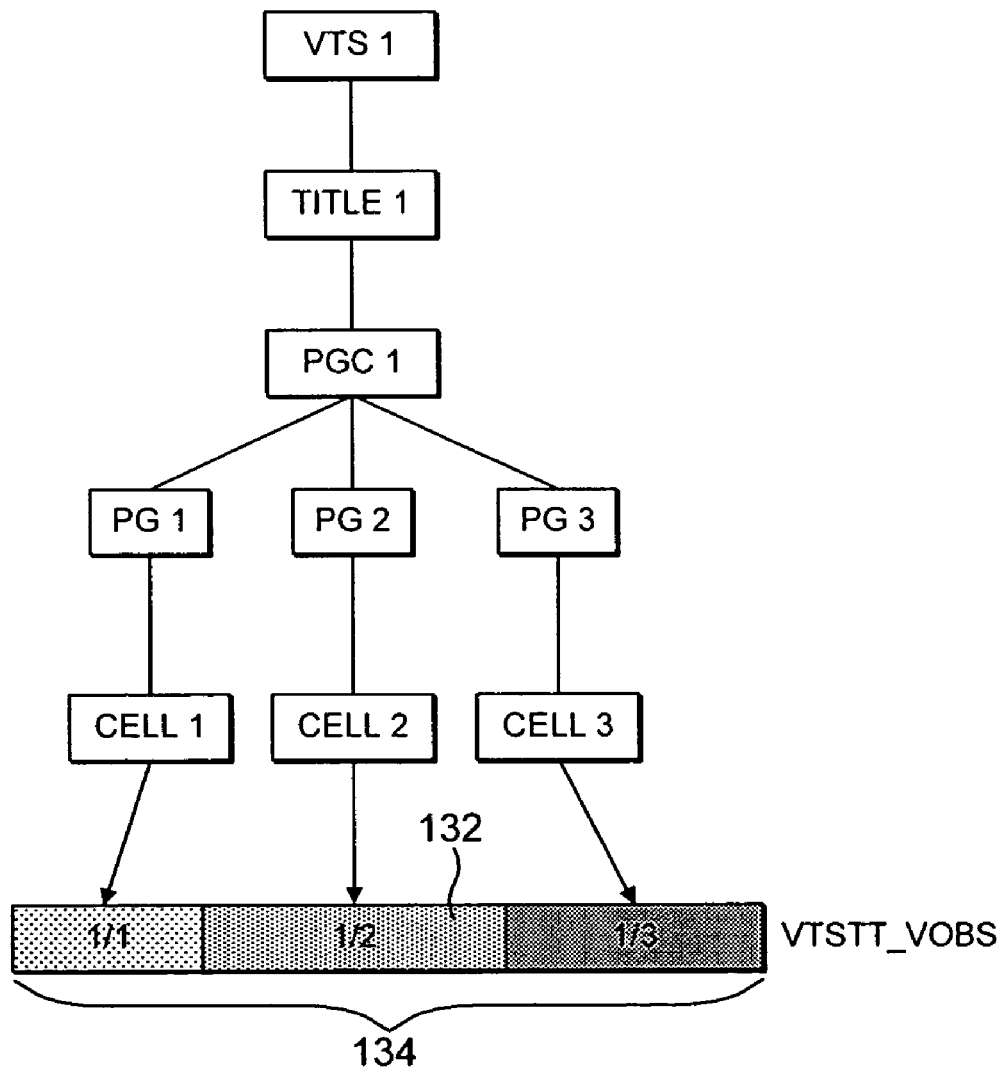
FIG. 11 shows a video title set for content arranged along a single sequential navigable path.
Figure 12:
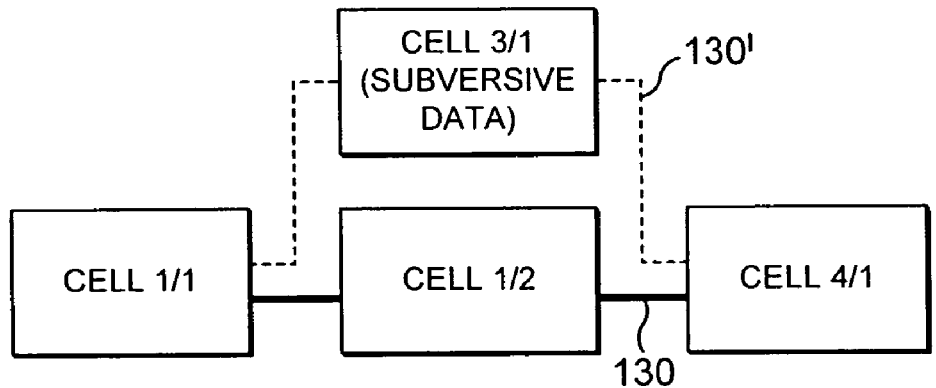
FIG. 12 shows the provision of subversive data to a structure as shown in FIG. 11.
Figure 12:
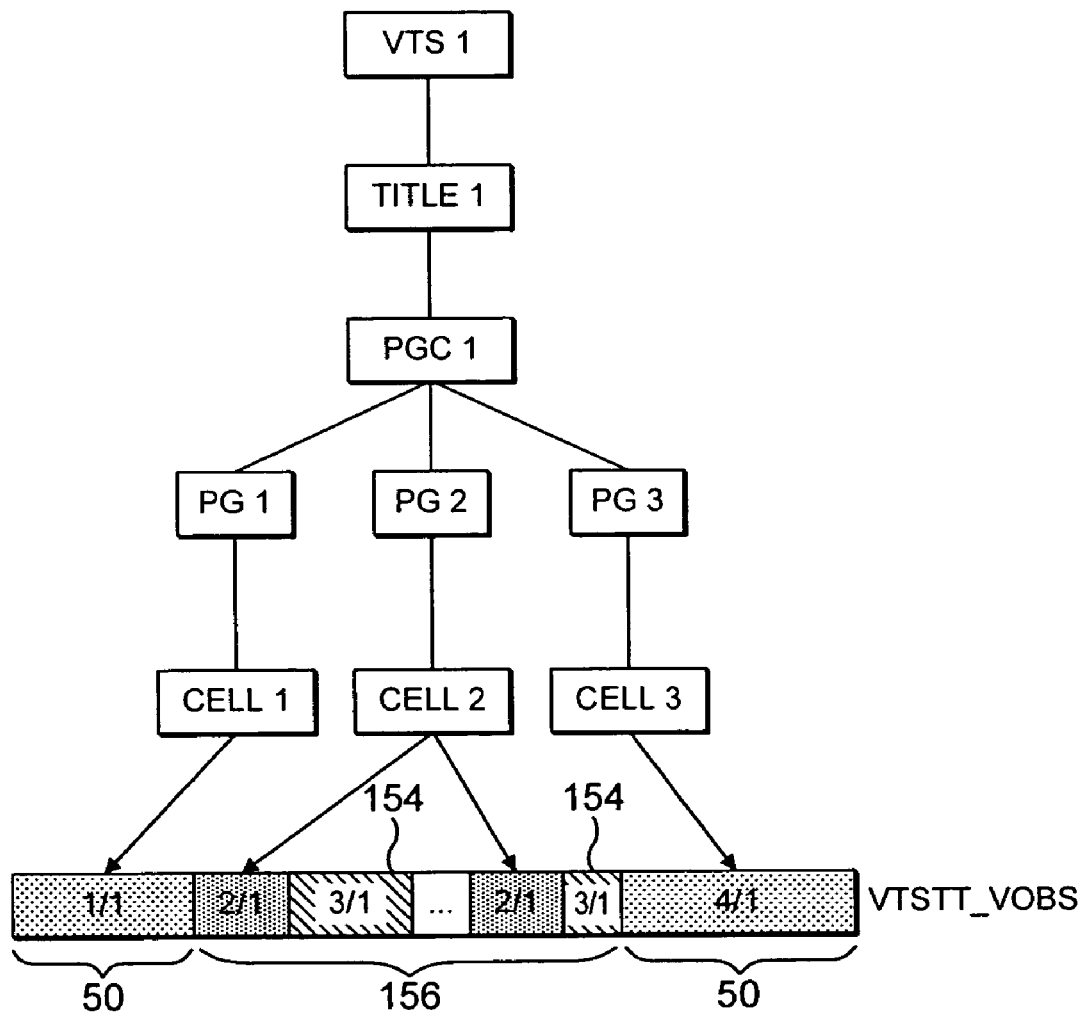

This interleaving technique can be utilised to provide an alternative embodiment of the copy protection technique as described above, as is illustrated in FIGS. 11 and 12. Thus, and as shown in FIG. 11, the cells with the content which is to be played are provided along a single, sequential, navigable path. However, an additional cell 3/1 is provided which contains subversive data, as is illustrated in FIG. 12. Specifically, an additional video object, VOB 3, split into one or more ILVUs 154 is provided, where one or more ILVUs 154 contain subversive data and are interleaved with existing content data.

The arrangement of the subversive data on the disc is shown in FIG. 12 which illustrates an interleaved block 156 composed of two video objects, VOB 2 and VOB 3, which have been interleaved. This interleaved block 156 is interposed between the first and fourth video objects 50. It will be appreciated from FIG. 11 that cell 1/2 contains playable information. This cell 1/2 has been assigned a new VOB ID and effectively sliced and interleaved with the ILVUs 154 of subversive data. As indicated, pointers navigate the drive over the regions of subversive data. In addition, buffer zones and other techniques may be used within the subversive data regions to ensure that they do not interfere with normal play of the disc.

The subversive data may be any data which will stop a drive reading or playing an optical disc and may be in accordance with any of the examples described above.

Figure 13:
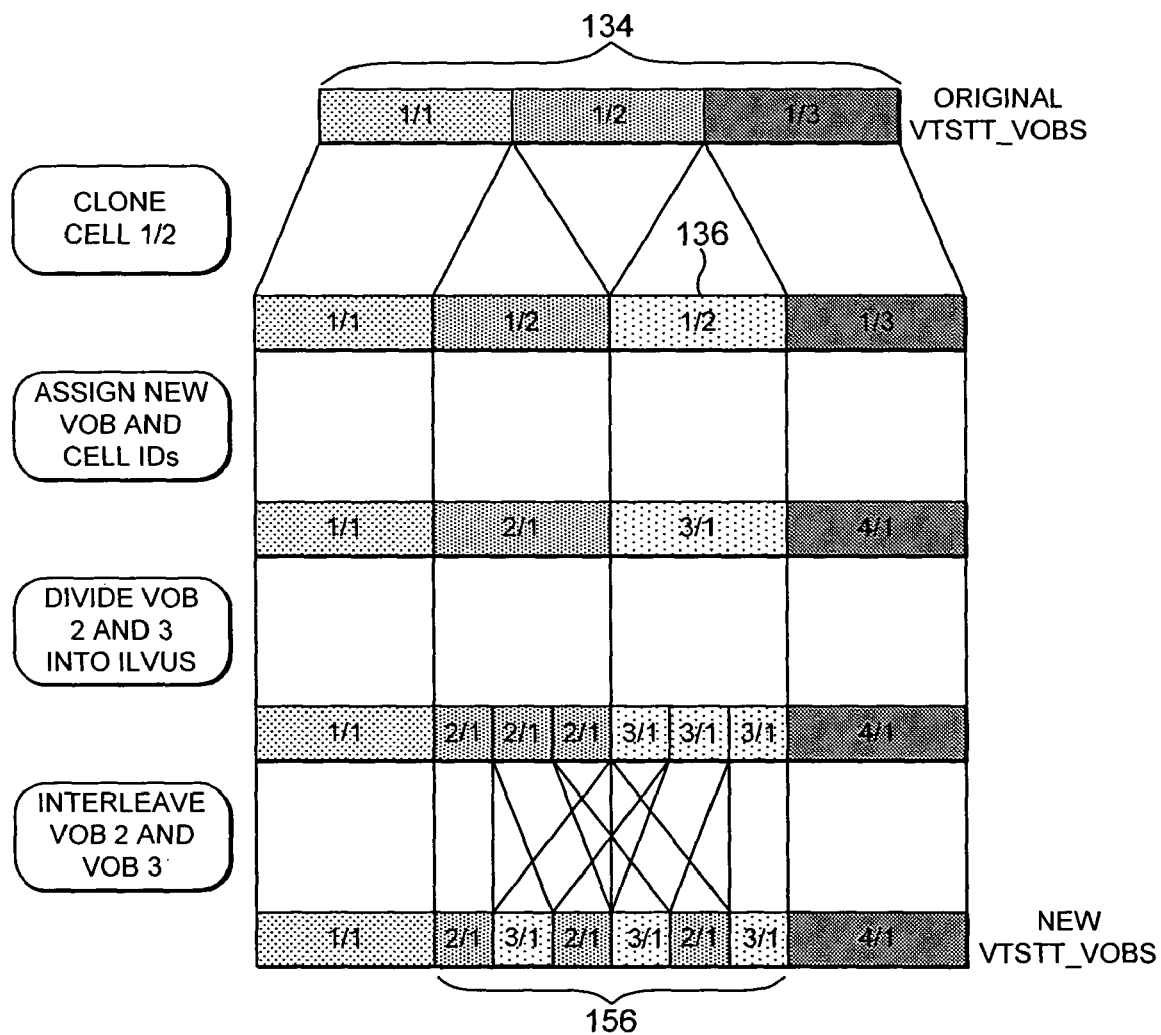
FIG. 13 illustrates the creation of an interleaved block.

FIGS. 11, 12 and 13 illustrate how an interleaved block 156 can be created, and how subversive data, including any pre- or post-buffering data, can be arranged in unplayed interleaved units (ILVUs). FIG. 11 shows original material having only a single playback path 130. FIG. 11 also shows the corresponding logical structure of the relevant video title set VTS 1. As shown, the single relevant video title set VTS 1 has one program chain PGC 1 with three programs PG 1, PG 2, PG 3, and three pointers cell 1, cell 2, cell 3 pointing to a contiguous block 134 in VTSTT_VOBS. It will be appreciated that generally execution of the program chain PGC 1 will play the cells 1/1, 1/2 and 1/3 in order, that is, playback will be along the path 130.

FIG. 12 shows the provision of subversive data 154 in a cell 3/1 to which there is no navigable path. FIG. 12 also shows the logical structure of the relevant video title set VTS 1. It will be seen that the navigable path 130 of FIG. 12 includes cells 1/1, 2/1 and 4/1. The cell 3/1, containing the subversive data, is provided along a non-navigable path 130'. As in FIG. 11, the structure of FIG. 12 has a single program chain PGC 1 with three programs PG 1, PG 2 and PG 3, and three pointers cell 1, cell 2, cell 3. As set out above, the subversive data 154 in the third video object has been interleaved with the second video object to form the interleaved block 156 having unplayed interleaved units 154.

It will be seen that none of the pointers cell 1, cell 2, cell 3 access the ILVUs 154. Thus, playback of the structure of FIG. 12 will be along the playback path 130 and the subversive data 154 will not be accessed. However, and as previously, attempts to copy a disc, with a structure as in FIG. 12, on a sector by sector or file by file basis will either result in a failed, or significantly slow, read operation or produce an unplayable copy.

FIG. 13 shows one embodiment of the creation of an interleaved block 156 from a contiguous block 134 in the VTST-T_VOBS. In this respect, and as will be known, to effectively perform interleaving, new video objects need to be created. FIG. 13 shows the original cells 1/1, 1/2 and 1/3 (134) in the VTSTT_VOBS. The cell 1/2 is then cloned to produce clone 136 which is inserted between cells 1/2 and 1/3. In this respect, it will be appreciated that instead of cloning a cell other material may be inserted into VTSTT_VOBS.

When the additional cell or material has been inserted, new cell IDs and video object IDs are assigned. As shown in FIG. 13, the four regions or cells 1/1, 1/2, 1/2 and 1/3, are assigned new VOB and Cell IDs. The second and third video objects, VOB 2 and VOB 3, are each divided into an equal number of interleaved units which are then interleaved as shown in FIG. 13.

In addition, the Navigation packs for the VOBUs in the VTSTT_VOBS and the tables in the VMGI and in the VTSI for the relevant video title set VTS need to be adjusted to effect these changes.

As explained above, for a copy protection technique according to an embodiment of the invention, it is required to provide subversive data in unplayed interleaved units. In the arrangement of FIG. 12, formed using the technique indicated in FIG. 13, therefore, the subversive data is incorporated into the cell 3/1 as indicated in FIG. 12.

Figure 14:
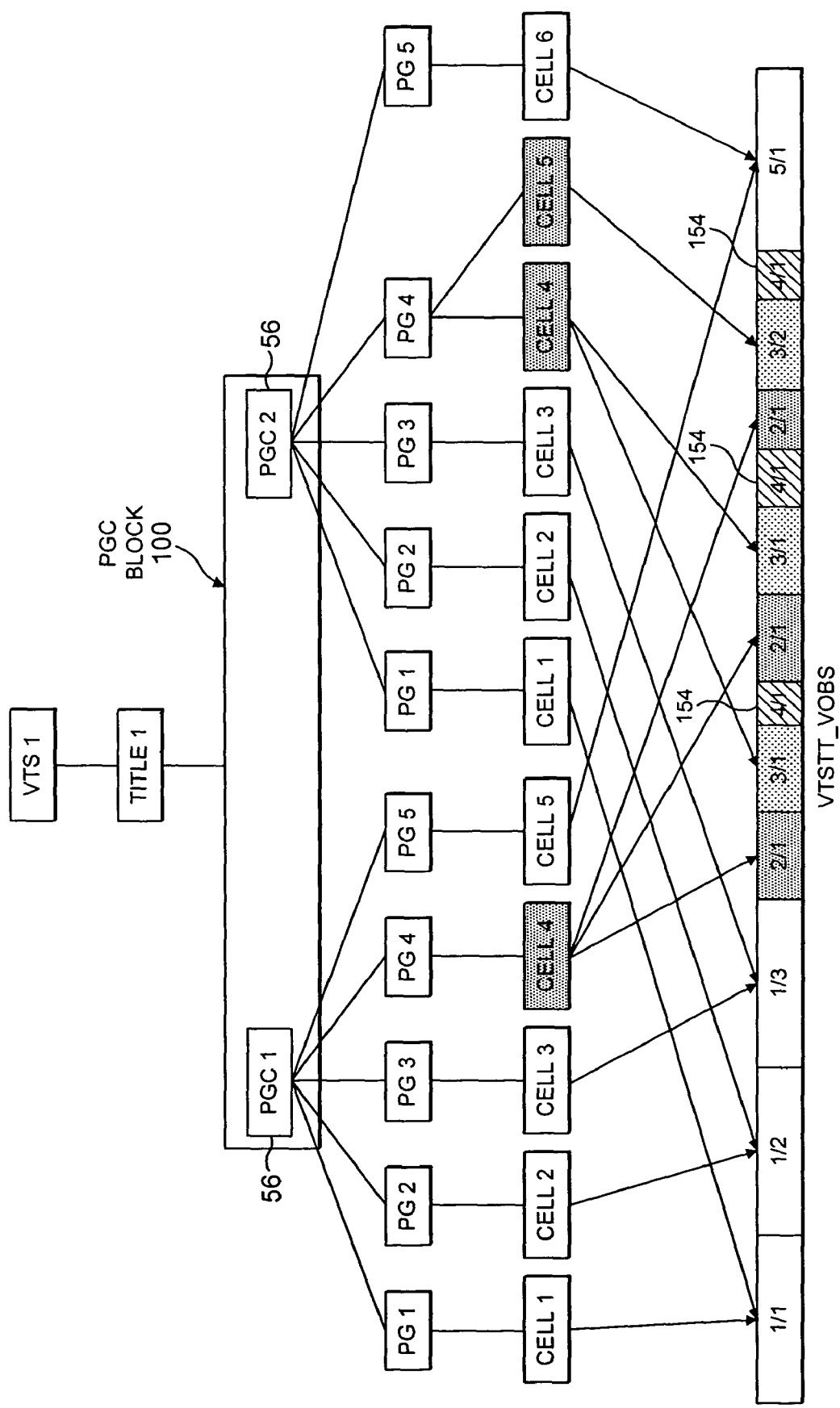
FIG. 14 shows the provision of interleaved subversive data in a pre-existing interleaved block.

FIG. 14 shows a video title set in which subversive data has been inserted into an interleaved block which already exists in the VTSTT_VOBS. Thus, VOBs 2 and 3 were already interleaved in the original VTSTT_VOBS. Then a further interleaved VOB is added. As illustrated, an additional VOB, which is to be interleaved with VOBs 2 and 3 is assigned VOB ID=4 and VOB ID 5 is assigned to the original VOB 4. Subversive data 154 is inserted into one or more of the unplayed interleaved units of the new VOB 4. As previously, there are no navigable paths to the new VOB 4.

In the embodiments described, an optical disc is copy protected by incorporating subversive data in the data area, for example, in or between content files, and by ensuring that no navigable paths lead to the subversive data. This ensures that the optical disc can be played without problems but prevents the making of usable copies, particularly when copying is on a sector by sector or file by file basis.

An additional or alternative technique is to provide pointers to subversive data but to alter control data associated with the programs so that regions including subversive data are not accessed during playback. For example, in a structure as shown in FIG. 12, pointers (not shown) may be provided in program chain PGC 1 to cell 3/1. However, suitable precommands or other arrangements are made such that the playback of cell 3/1 is prevented. This technique is effective to prevent copying where the copying device copies by identifying each program path and then copies the cells accessed by the program paths.

It will be appreciated that modifications of, and alterations to, the embodiments as described and illustrated may be made within the scope of this application.

The invention claimed is:

1. A copy protected optical disc carrying content and control data in a data area, the content being arranged in one or more content files, and the control data providing access to the content, wherein at least one region of the content includes subversive data within the data area, wherein at least one region of subversive data is formed within an individual content file, the subversive data causing disruption of a read operation during unauthorized use, wherein the subversive data includes data patterns chosen to cause Digital Sum Value (DSV) problems when the subversive data is accessed, the control data including at least one program chain for navigation to the content during normal playback, the at least one program chain preventing access to the subversive data during normal playback of the content.

2. A copy protected optical disc according to claim 1, wherein the content files are video object files and are composed of video objects (VOBs) which are divided into cells, and wherein the cells can be accessed by respective pointers in a program chain.

3. A copy protected optical disc according to claim 2, wherein at least one region of subversive data is formed as an additional cell within a video object.

4. A copy protected optical disc according to claim 3, wherein there are no pointers accessing the at least one region of subversive data.

5. A copy protected optical disc according to claim 3, wherein there are pointers accessing at least one region of subversive data but programs defined by said control data are altered such that the subversive data is not accessed during normal playback of the content of the copy protected optical disc.

6. A copy protected optical disc according to claim 2, wherein at least one region of subversive data is formed in an existing cell within a video object.

7. A copy protected optical disc according to claim 2, wherein at least one region of subversive data is formed in a video object which is interleaved with existing content.

8. A copy protected optical disc according to claim 7, wherein there are no pointers accessing the at least one region of subversive data.

9. A copy protected optical disc according to claim 7, wherein there are pointers accessing at least one region of subversive data but program chains defined by said control data are altered such that the subversive data is not accessed during normal playback of the content of the copy protected optical disc.

10. A copy protected optical disc according to claim 1, wherein the at least one region of subversive data contains both buffering data and subversive data.

11. A copy protected optical disc according to claim 10, wherein the at least one region contains buffering data followed by subversive data.

12. A copy protected optical disc according to claim 10, wherein the at least one region contains buffering data following the subversive data.

13. A copy protected optical disc according to claim 10, wherein said buffering data has non-subversive properties.

14. A copy protected optical disc according to claim 1, wherein said subversive data includes data patterns chosen to cause read errors.

15. A copy protected optical disc according to claim 14, wherein said data patterns have been chosen to ensure that the DSV has a significant absolute value.

16. A copy protected optical disc according to claim 14, wherein said data patterns have been chosen to produce a DSV which has a rapid rate of change.

17. A copy protected optical disc according to claim 1, wherein said subversive data has incorrect control data associated therewith.

18. A copy protected optical disc according to claim 17, wherein said incorrect control data associated with the subversive data comprises incorrect error correcting codes.

19. A copy protected optical disc according to claim 1, wherein said subversive data includes or has mistimed waveform transitions.

20. A copy protected optical disc according to claim 1, wherein said subversive data includes bits or sectors which have been mechanically or physically damaged.

21. A copy protected optical disc according to claim 1, wherein said subversive data includes information bits or sectors of information bits whose information content has been rendered incorrect.

22. A method of copy protecting an optical disc carrying content and control data in a data area, wherein the content is arranged in one or more content files, and the control data provides access to the content, the method comprising:
modifying, by use of a processor, at least one region of the content within the data area to contain subversive data, wherein at least one region of subversive data is formed within an individual content file, the subversive data causing disruption of a read operation during unauthorized use, wherein the subversive data includes data patterns chosen to cause Digital Sum Value (DSV) problems when the subversive data is accessed, the control data including at least one program chain for navigation to the content during normal playback; and
navigating the at least one program chain to play the content during normal playback, the at least one program chain preventing access to the subversive data during normal playback of the content.

23. A method of copy protecting an optical disc according to claim 22, wherein the content files are video object files which are composed of video objects (VOBs) which are divided into cells, and wherein the cells can be accessed by respective pointers in a program chain.

24. A method of copy protecting an optical disc according to claim 23, further comprising forming at least one region of subversive data as an additional cell within a video object.

25. A method of copy protecting an optical disc according to claim 23, further comprising forming at least one region of subversive data in an existing cell within a video object.

26. A method of copy protecting an optical disc according to claim 23, further comprising forming at least one region of subversive data within a video object which is interleaved with existing content.

27. A method of copy protecting an optical disc according to claim 22, further comprising arranging that there are no pointers accessing the at least one region of subversive data.

28. A method of copy protecting an optical disc according to claim 22, wherein there are pointers accessing the at least one region of subversive data, and the method comprising altering program chains defined by said control data such that the subversive data is not accessed during normal playback of the content on the optical disc.

29. A method of copy protecting an optical disc according to claim 22, wherein both buffering data and subversive data are provided within the at least one region of subversive data.

30. A method of copy protecting an optical disc according to claim 29, further comprising forming the subversive data in the at least one region so that it is surrounded by buffering data.

31. A method of copy protecting an optical disc according to claim 22, further comprising including data patterns, which have been chosen to cause read errors.

32. A method of copy protecting an optical disc according to claim 31, wherein said data patterns have been chosen to ensure that the DSV has a significant absolute value.

33. A method of copy protecting an optical disc according to claim 31, wherein said data patterns have been chosen to produce a DSV which has a rapid rate of change.

34. A method of copy protecting an optical disc according to claim 22, further comprising rendering control data in a region of the data area incorrect to provide the subversive data.

35. A method of copy protecting an optical disc according to claim 34, wherein said incorrect control data associated with the subversive data comprises incorrect error correcting codes.

36. A method of copy protecting an optical disc according to claim 22, further comprising including mistimed waveform transitions in data in a region of the data area to provide the subversive data.

37. A method of copy protecting an optical disc according to claim 22, further comprising mechanically or physically damaging bits or sectors within a region of the data area to produce subversive data.

38. A method of copy protecting an optical disc according to claim 22, further comprising including information bits or sectors of information bits whose information content has been rendered incorrect in a region of the data area to provide the subversive data.

39. An apparatus to read content and control data encoded on a data carrying disc, the content being arranged in one or more content files, the control data providing access to the content, the content includes at least one region containing subversive data formed within an individual content file, the subversive data causing disruption of a read operation during unauthorized use, wherein the subversive data includes data patterns chosen to cause Digital Sum Value (DSV) problems when the subversive data is accessed, the control data including at least one program chain for navigation to the content during normal playback, the at least one program chain preventing access to the subversive data during normal playback of the content.

40. The apparatus according to claim 39, wherein said region contains both buffering data and subversive data.

41. The apparatus according to claim 40, wherein said region contains buffering data followed by subversive data.

42. The apparatus according to claim 40, wherein said region contains buffering data following the subversive data.

43. The apparatus according to claim 40, wherein said buffering data has non-subversive properties.

44. The apparatus according to claim 39, wherein the content files are video object files which are composed of video objects (VOBs) which are divided into cells, and wherein the cells can be accessed by respective pointers in a program chain.

45. The apparatus according to claim 44, wherein the or each region of subversive data is formed as an additional cell within a video object.

46. The apparatus according to claim 44, wherein at least one region of subversive data is formed in an existing cell within a video object.

47. The apparatus according to claim 44, wherein at least one region of subversive data is formed in a video object which is interleaved with existing content.

48. The apparatus according to claim 44, wherein the program chains do not include pointers accessing at least one region of subversive data.

49. The apparatus according to claim 44, wherein the program chains do include pointers accessing at least one region of subversive data but the control data defining the program chains is altered such that the subversive data is not accessed during normal playback of the content on the data carrying disc.

50. The apparatus according to claim 39, wherein the subversive data includes data patterns chosen to cause read errors.

51. The apparatus according to claim 50, wherein said data patterns have been chosen to ensure that the DSV has a significant absolute value.

52. The apparatus according to claim 50, wherein said data patterns have been chosen to produce a DSV which has a rapid rate of change.

53. The apparatus according to claim 39, wherein the subversive data has incorrect control data associated therewith.

54. The apparatus according to claim 53, wherein the incorrect control data associated with the subversive data comprises incorrect error correcting codes.

55. The apparatus according to claim 39, wherein the subversive data includes or has mistimed waveform transitions.

56. The apparatus according to claim 39, wherein the subversive data includes information bits or sectors of information bits whose information content has been rendered incorrect.

* * * * *

UNITED STATES PATENT AND TRADEMARK OFFICE
CERTIFICATE OF CORRECTION

| | | |
|---|---|---|
| PATENT NO. | : 8,059,937 B2 | Page 1 of 1 |
| APPLICATION NO. | : 10/939186 | |
| DATED | : November 15, 2011 | |
| INVENTOR(S) | : Carmen L. Basile et al. | |

It is certified that error appears in the above-identified patent and that said Letters Patent is hereby corrected as shown below:

In column 2, line 58, delete "and or" and insert -- and/or --, therefor.

In column 3, line 62, delete "and or" and insert -- and/or --, therefor.

In column 6, line 64, delete "$R_5$" and insert -- $R_{15}$ --, therefor.

In column 7, lines 36-50, below "The" delete "DVD-Video zone 43 comprises structures such as a Video Manager (VMG) and a number of video title sets (VTSs). Information files (IFO) 48 are provided in the Video Manager (VMG) and in each of the video title sets (VTSs) and provide the syntax by which navigation to video objects (VOBs) 50 is achieved. As is well known, each video object 50 contains MPEG streams, such as video, audio, and other content streams. The other content streams may comprise text and graphics, for example. A video object 50 also includes control data for controlling the presentation of its content together with control data enabling the data within the video object to be searched. The video objects 50 compose a set of video objects for the titles (VTSTT_VOBS) in video title set VTS#1. The VTSTT_VOBS is divided into video object files 51 whose size does not exceed 1 GB.", and insert the same on Col. 7, Line 35 as a continuation of the same Paragraph.

In column 9, line 8, delete "that that" and insert -- that --, therefor.

Signed and Sealed this
Twenty-fourth Day of January, 2012

David J. Kappos
*Director of the United States Patent and Trademark Office*